C. J. O'RIELY.
FOLDING FRYING PAN.
APPLICATION FILED MAR. 25, 1916.

1,210,974.

Patented Jan. 2, 1917.

Witness:
W. M. Gentle.

Inventor.
Cornelius J. O'Riely
By
Attorney.

UNITED STATES PATENT OFFICE.

CORNELIUS J. O'RIELY, OF LOS ANGELES, CALIFORNIA.

FOLDING FRYING-PAN.

1,210,974.

Specification of Letters Patent.

Patented Jan. 2, 1917.

Application filed March 25, 1916. Serial No. 86,807.

*To all whom it may concern:*

Be it known that I, CORNELIUS J. O'RIELY, a citizen of the United States of America, residing at Los Angeles, county of Los Angeles, State of California, have invented a certain new and useful Folding Frying-Pan; and I do hereby declare the following to be a full, clear, and exact description of the invention, such as will enable others skilled in the art to which it appertains to make and use the same.

This invention relates to a novel and improved folding frying pan; and it may be said to consist in the provision of the novel and advantageous features and in the novel and improved construction, arrangement, and combination of parts as will be apparent from the description and claims which follow hereinafter.

One object of the invention is to provide a novel and improved frying pan provided with a handle consisting of a single piece of metal rod which is doubled and formed to fit closely against the lower part of the pan and which has one end portion thereof pivotally attached to the lower part of the pan and has the other end portion thereof provided with a projection adapted to fit into a socket which is provided on the upper part of the pan.

Further objects of the invention are to provide a novel and improved frying pan of the character specified which is well adapted for camping and outing purposes, and is simple in construction, economical to manufacture, strong and durable and easy and convenient to use.

Other objects and the advantages of the invention will be apparent to those skilled in the art from a careful consideration of the following description of the preferred construction embodying the invention, taken in connection with the accompanying drawings in which—

Figure 1:
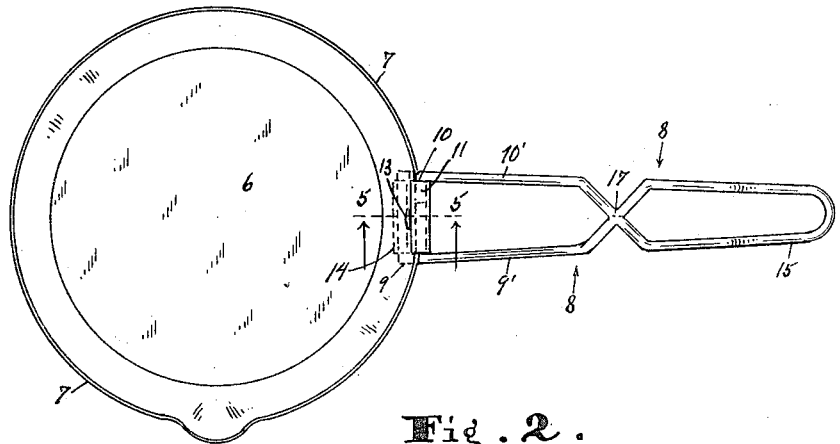
Figure 2:
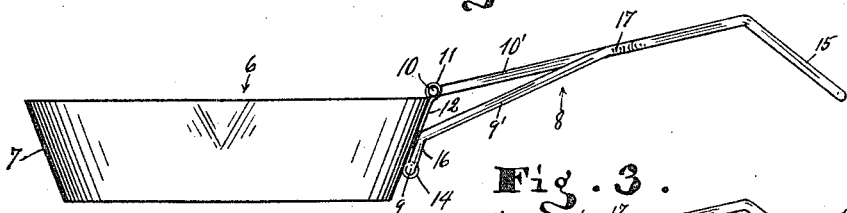
Figure 3:
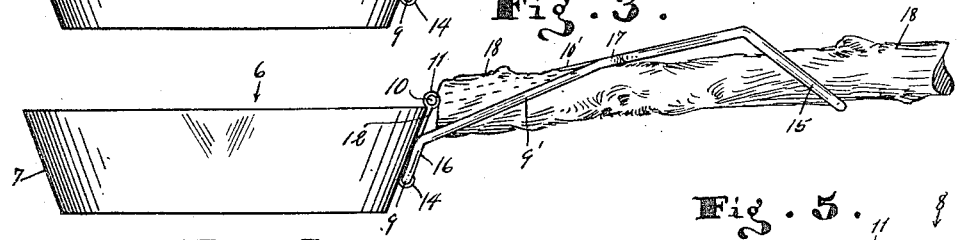
Figure 5:
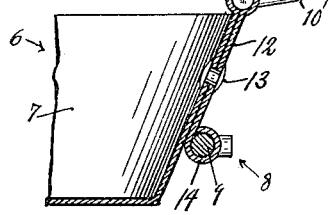
Figure 4:
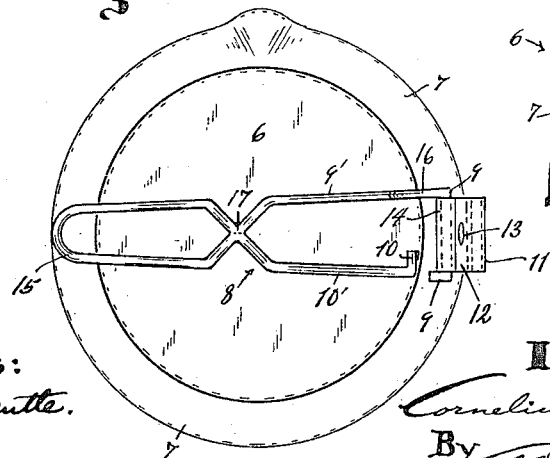

Figure 1 is a top plan view of the improved frying pan with the handle in extended position; Fig. 2 is an elevational view of the same; Fig. 3 is an elevational view of the frying pan with a stick that may be placed on the handle should the latter become too hot; Fig. 4 is a bottom plan view of the frying pan with the handle in the folded position; and Fig. 5 is an enlarged broken sectional view taken on the line 5—5 of Fig. 1.

As shown in the drawings, the pan 6 is provided with the raised border 7, and it is provided with the handle 8 consisting of a single piece of metal rod which is doubled and formed to fit closely against the lower part of the pan 6 and which has the end portion 9 of the arm 9' thereof pivotally attached to the lower part of the pan 6, and has on the end portion of the arm 10' thereof a projection 10 which is removably fitted in the socket 11 provided on the upper part of the pan 6. A strip 12 of sheet metal, which may be integral with the raised border 7, is bent to form the socket 11 on the upper edge of the raised border 7 and it extends downwardly on and is secured to the raised border 7 by the rivet 13, and it is bent to form the pivot bearing 14 for the end portion 9 of the arm 9'. The free end portion of the handle 8 is provided with an offset 15, and the arm 9' is provided with an offset 16; which offsets 15 and 16 lie close and substantially in parallel to the raised border 7 when the handle 8 is in the folded position on the pan 6. The arms 9' and 10' are brought close to each other or the handle 8 is provided with a crossconnected portion 17, so that a stick 18 can be placed through the offset 15 and bear against the crossconnected portion 17 to lift the pan 6 away from a fire when the handle 8 is too hot.

From the foregoing the construction and advantages of the improved frying pan will be understood by those skilled in the art. It will be seen that the handle 8 is strong and it is rigidly connected to the pan when it is in the extended position, the offset 16 affording an abutment against the lower part of the pan to brace the latter in an effective manner. To fold the handle 8 against the outer lower part of the pan, it is merely necessary to spring the arm 10' away from the arm 9' to remove the projection 10 from the socket 11 and then swing the handle to the folded position. With the handle in the folded position the frying pan can easily be carried and packed with dishes, etc., in outing or camping outfits.

I claim:

1. The herein-described frying pan having a raised border with a socket on the upper part thereof and provided with a handle consisting of a single piece of metal rod which is doubled and formed to fit closely against the outer lower part of the pan and which has one end portion thereof pivotally attached to, and formed with an offset adapted to brace the lower part of the pan and has on the other end portion thereof a projection which is removably fitted in said socket.

2. A frying pan having a raised border provided with a socket on the upper part thereof and with a pivot bearing on the lower part thereof and having a handle consisting of a metal rod which is doubled to provide spaced arms, and formed to fit against the outer lower part of the pan, said handle being provided with an offset and a connection between the arms as set forth, and one of the arms having the end portion thereof provided with a projection removably fitted in said socket, and the other of the arms having the end portion thereof fitted in the pivot bearing and provided with an offset which latter when the handle is in the extended position affords an abutment against the lower part of the pan to brace the latter in an effective manner substantially as set forth.

In testimony whereof, I have signed my name to this specification at Los Angeles, county of Los Angeles, State of California, this 18th day of March A. D. 1916.

CORNELIUS J. O'RIELY.

Copies of this patent may be obtained for five cents each, by addressing the "Commissioner of Patents, Washington, D. C."